US011803931B2

(12) United States Patent
Sakurada et al.

(10) Patent No.: US 11,803,931 B2
(45) Date of Patent: Oct. 31, 2023

(54) INFORMATION PROCESSING METHOD, INFORMATION PROCESSING APPARATUS, AND INFORMATION PROCESSING SYSTEM

(71) Applicant: TOYOTA JIDOSHA KABUSHIKI KAISHA, Toyota (JP)

(72) Inventors: Shin Sakurada, Toyota (JP); Kazuya Nishimura, Toyota (JP); Masaru Ando, Seto (JP); Toshinari Honda, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 17/198,854

(22) Filed: Mar. 11, 2021

(65) Prior Publication Data
US 2021/0327014 A1  Oct. 21, 2021

(30) Foreign Application Priority Data

Apr. 16, 2020 (JP) ................. 2020-073587

(51) Int. Cl.
*G06Q 50/30* (2012.01)
*G06Q 30/0645* (2023.01)
(52) U.S. Cl.
CPC ......... *G06Q 50/30* (2013.01); *G06Q 30/0645* (2013.01)
(58) Field of Classification Search
CPC ..... G06Q 50/30; G06Q 30/0645; G06Q 30/06
USPC .......................................................... 705/13
See application file for complete search history.

(56) References Cited

U.S. PATENT DOCUMENTS

| 6,157,315 A * | 12/2000 | Kokubo ................. G07B 15/00 340/432 |
| 2013/0325521 A1* | 12/2013 | Jameel ................... G06Q 10/02 705/5 |
| 2014/0149156 A1* | 5/2014 | Schroeder ............... E04H 6/426 705/5 |
| 2014/0172727 A1 | 6/2014 | Abhyanker et al. |

(Continued)

FOREIGN PATENT DOCUMENTS

| CN | 107481078 A | 12/2017 | |
| FR | 2980882 | * 4/2013 | ............ B60L 53/16 |

(Continued)

OTHER PUBLICATIONS

Roe, Exploring an Ideal Car Club Design form a User's Perspective, PQDT—UK & Ireland, ProQuest Dissertations Publishing (2017) (Year: 2017).*

*Primary Examiner* — Jeff Zimmerman
*Assistant Examiner* — Mark C Clare
(74) *Attorney, Agent, or Firm* — Sughrue Mion, PLLC

(57) ABSTRACT

An information processing apparatus is configured to acquire a rental request for a company vehicle used for a business operation of a company, select the company vehicle, in response to the rental request, from among private vehicles that are used by employees of the company when they go to work and are available as the company vehicle, and provide, in a case where a private vehicle is selected in selecting the company vehicle in response to the rental request and rented out as the company vehicle, to a requestor who has sent the rental request availability information that enables the requestor to use the selected private vehicle.

15 Claims, 11 Drawing Sheets

(56) References Cited

U.S. PATENT DOCUMENTS

| | | | |
|---|---|---|---|
| 2016/0027307 A1* | 1/2016 | Abhyanker | G08G 1/202 |
| | | | 701/117 |
| 2017/0274871 A1* | 9/2017 | Nishiyama | B60R 25/01 |
| 2017/0374047 A1* | 12/2017 | Fujiwara | B60R 25/2018 |
| 2019/0122470 A1 | 4/2019 | Endo et al. | |
| 2019/0266531 A1 | 8/2019 | Umeda et al. | |

FOREIGN PATENT DOCUMENTS

| | | | | |
|---|---|---|---|---|
| JP | 2004-252661 A | | 9/2004 | |
| JP | 2012-048462 A | | 3/2012 | |
| JP | 2019061575 | * | 9/2017 | G06Q 10/06 |
| JP | 2019-061575 A | | 4/2019 | |
| JP | 2019-079272 A | | 5/2019 | |
| JP | 2019-148911 A | | 9/2019 | |
| JP | 2021039593 | * | 9/2019 | G06Q 40/08 |

* cited by examiner

FIG. 6

VEHICLE DB

| ITEMS | VEHICLE ID | VEHICLE-RELATED INFORMATION | VEHICLE IMAGE | EMPLOYEE INFORMATION | LEAVING TIME | RENTAL CONDITIONS |
|---|---|---|---|---|---|---|
| 1 | V1 | V11 | IM1 | E1 | 17:30 | C1 |
| 2 | V2 | V12 | IM2 | E2 | 17:30 | C2 |
| 3 | V3 | V13 | IM3 | E3 | 17:30 | C3 |
| 4 | V4 | V14 | IM4 | E4 | 17:30 | C4 |
| 5 | V5 | V15 | IM5 | E5 | 17:30 | C5 |

FIG. 7

RENTAL REQUEST

| |
|---|
| EMPLOYEE INFORMATION |
| DESIRED VEHICLE INFORMATION |
| SCHEDULED RETURN TIME |
| OTHER INFORMATION |

FIG. 9

COMPANY VEHICLE DB

| VEHICLE ID | STATUS | NUMBER | USER | SCHEDULED RETURN TIME | TIME WHEN VEHICLE IS RETURNED | DELAY | REASON WHY RETURN WAS LATE |
|---|---|---|---|---|---|---|---|
| V1 | RENTED OUT | 1 | U1 | 17:00 | | | |
| V3 | UNUSED | 2 | U2 | | | | |
| V4 | UNUSED | 3 | U3 | | | | |
| | | | | | | | |
| | | | | | | | |

INFORMATION PROCESSING METHOD, INFORMATION PROCESSING APPARATUS, AND INFORMATION PROCESSING SYSTEM

CROSS-REFERENCE TO RELATED APPLICATION

This application claims priority to Japanese Patent Application No. 2020-073587 filed on Apr. 16, 2020, incorporated herein by reference in its entirety.

BACKGROUND

1. Technical Field

The present disclosure relates to an information processing method, an information processing apparatus, and an information processing system.

2. Description of Related Art

A car-sharing system between a company and employees is proposed in which the company rents out a vehicle, leased from a rental company, as the company vehicle to the employees for private use (for example, Japanese Unexamined Patent Application Publication No. 2019-61575).

SUMMARY

The present disclosure provides an information processing method, an information processing apparatus, and an information processing system, each of which can make effective use of a private vehicle used by an employee of a company when he/she goes to work.

A first aspect of the present disclosure is an information processing method. An information processing method executed by an information processing apparatus includes a step of acquiring a rental request for a company vehicle used for a business operation of a company, a step of selecting a company vehicle, in response to the rental request, from among private vehicles that are used by employees of the company when they go to work and are available as the company vehicle, and a step of providing, in a case where a private vehicle is selected in selecting the company vehicle in response to the rental request and rented out as the company vehicle, to a requestor who has sent the rental request, availability information that enables the requestor to use the selected private vehicle.

In the first aspect, the information processing apparatus may select a company vehicle, in response to the rental request, from among the private vehicles that are used by the employees of the company when they go to work and are parked in a parking space for the private vehicles that are available as the company vehicle.

In the first aspect, the information processing apparatus may select a company vehicle, in response to the rental request, from among the private vehicles parked in the parking space, that are specified based on an output from a sensor provided in the parking space.

In the first aspect, the information processing apparatus may select, in selecting a company vehicle in response to the rental request, a private vehicle that matches at least one of a kind of a vehicle, seating capacity, a color, and a kind of a power source that are desired by the requestor who has sent the rental request and are included in the rental request.

In the first aspect, the information processing apparatus may select, in selecting a company vehicle in response to the rental request, a private vehicle that is available as the company vehicle and is owned by an employee who leaves work at a time later than a scheduled return time of the company vehicle. The scheduled return time is included in the rental request.

In the first aspect, the information processing apparatus may transmit the availability information to a portable terminal owned by the requestor who has sent the rental request.

In the first aspect, the information processing apparatus may transmit the availability information to the portable terminal different from a terminal used for sending the rental request.

In the first aspect, the availability information may include information for activating the portable terminal as an electronic key of the private vehicle rented out as the company vehicle.

In the first aspect, the information processing apparatus may provide, in a case where the private vehicle selected in selecting the company vehicle, in response to the rental request, is rented out as the company vehicle, information indicating that the selected private vehicle is rented out to the employee who owns the selected private vehicle.

In the first aspect, the information processing apparatus may provide, in a case where information indicating that the private vehicle rented out as the company vehicle will be returned is acquired by a predetermined time before the employee, who owns the private vehicle rented out as the company vehicle, leaves work, the information indicating the return to the employee who owns the private vehicle, and in a case where the information is not acquired, information indicating that the return will or may be delayed to the employee who owns the private vehicle.

A second aspect of the present disclosure is an information processing apparatus. The information processing apparatus includes at least one processor configured to acquire a rental request for a company vehicle used for a business operation of a company, select a company vehicle, in response to the rental request, from among private vehicles that are used by employees of the company when they go to work and are available as the company vehicle, and provide, in a case where the private vehicle selected in selecting a company vehicle, in response to the rental request, is rented out as the company vehicle, to a requestor who has sent the rental request, availability information that enables the requestor to use the selected private vehicle.

In the second aspect, the at least one processor may select a company vehicle, in response to the rental request, from among the private vehicles that are used by the employees of the company when they go to work and are parked in a parking space for the private vehicles that are available as the company vehicle.

In the second aspect, the at least one processor may select a company vehicle, in response to the rental request, from among the private vehicles parked in the parking space, that are specified based on an output from a sensor provided in the parking space.

In the second aspect, the at least one processor may select, in selecting a company vehicle in response to the rental request, a private vehicle that matches at least one of a kind of a vehicle, seating capacity, a color, and a kind of a power source that are desired by the requestor who has sent the rental request and are included in the rental request.

In the second aspect, the at least one processor may select, in selecting a company vehicle in response to the rental request, a private vehicle that is available as the company vehicle and is owned by an employee who leaves work at a time later than a scheduled return time of the company vehicle. The scheduled return time is included in the rental request.

A third aspect of the present disclosure is an information processing system. The information processing system includes an information processing apparatus configured to acquire a rental request for a company vehicle used for a business operation of a company, select a company vehicle, in response to the rental request, from among private vehicles that are used by employees of the company when they go to work and are available as the company vehicle, and provide, in a case where a private vehicle selected in selecting the company vehicle in response to the rental request is rented out as the company vehicle, to a requestor who has sent the rental request, availability information that enables the requestor to use the selected private vehicle, and a portable terminal that is configured to receive the availability information via a network, owned by the requestor has sent the rental request.

In the third aspect, the portable terminal may be different from the terminal used for sending the rental request to the information processing apparatus.

In the third aspect, the availability information may include information for activating the portable terminal as an electronic key of the selected private vehicle.

In the third aspect, the information processing system may further include a terminal that is a terminal owned by an employee who owns the selected private vehicle, and is configured to receive, in a case where the private vehicle is selected in selecting a company vehicle in response to the rental request and rented out as the company vehicle, information indicating that the selected private vehicle is rented out from the information processing apparatus via the network.

In the third aspect, the information processing system may further include a terminal that is a terminal owned by an employee who owns the selected private vehicle, and is configured to receive from the information processing apparatus via the network, in a case where the information processing apparatus acquires information indicating that the private vehicle rented out as the company vehicle will be returned by a predetermined time before the employee, who owns the private vehicle rented out as the company vehicle, leaves work, information indicating that the private vehicle will be returned, and receive from the information processing apparatus via the network, in a case where the information is not acquired, information indicating that the return will or may be delayed.

The other aspects of the present disclosure may include at least one of a program and a recording medium recording the program, each of which shares the same features as the information processing method. Furthermore, the other aspects of the present disclosure may include each of servers and terminals that constitute the information processing system.

With each aspect of the present disclosure, it is possible to make effective use of a private vehicle used by an employee of a company when they go to work.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 illustrates an example of a data structure of a vehicle database;

FIG. 7 illustrates an exemplified format of a rental request;

FIG. 9 illustrates an example of a data structure of the company vehicle database;

DETAILED DESCRIPTION OF EMBODIMENTS

Figure 1:
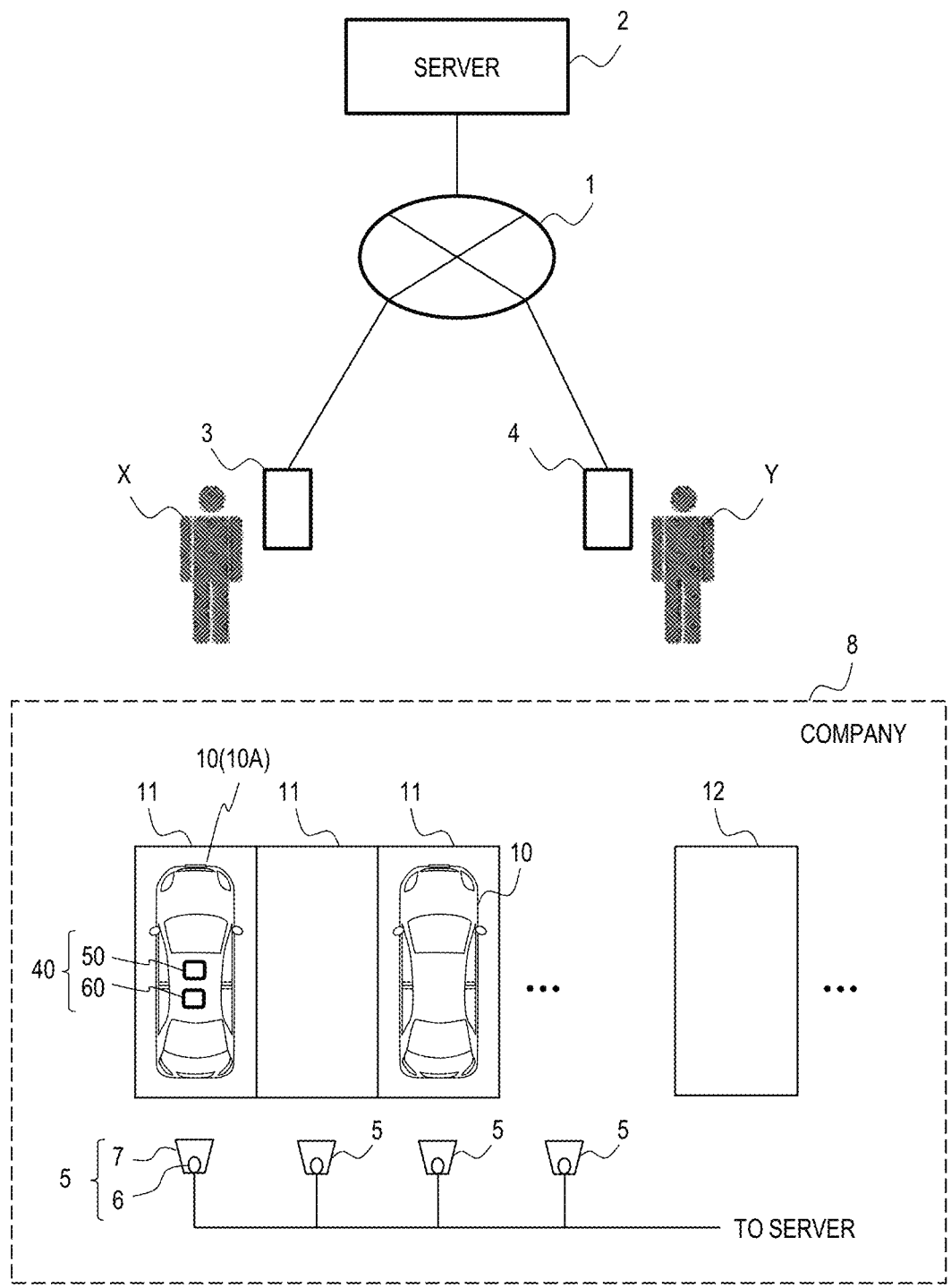
FIG. 1 is a schematic diagram of an information processing system according to one embodiment.

Some companies allow their employees to commute using private vehicles. When an employee goes to work, his/her private vehicle is parked in a parking space designated by a company and remains parked until he/she leaves work. On the other hand, the company holds vehicles used for business operations, such as sales, delivery, and a business trip, as company vehicles and rents them out to its employees. When many employees work away from the office, the company may run out of the company vehicles. However, increasing the number of company vehicles in consideration of such a situation causes an increase in fixed costs for the company, thus it is not always preferable.

Here, in the case where the private vehicles used when the employees go to work and parked in the parking space can be used as the company vehicles until the employees leave work, the company can avoid holding useless vehicles. Additionally, by offering incentives to the employees who allow their private vehicles to be used as the company vehicles, which are set to be lower than a cost of maintaining the company vehicle, it is possible to encourage the employees to rent out their vehicles, thus the company can secure the company vehicles. The employees who rent out the private vehicles can be given compensation without taking any action by getting the incentives. Hereinafter, in one embodiment, an information processing method, an information processing apparatus, and an information processing system that support an employee to rent out a private vehicle used when he/she goes to work as a company vehicle will be described.

The information processing method according to the embodiment is executed by the information processing apparatus, and includes:

(1) acquiring a rental request for a company vehicle used for a business operation of a company;

(2) selecting a company vehicle, in response to the rental request, from among private vehicles used by employees of the company when they go to work and can be used as the company vehicle; and (3) providing, in a case where a private vehicle is selected in selecting the company vehicle in response to the rental request and rented out as the company vehicle, to a requestor who has sent the rental request, availability information that enables the requestor to use the selected private vehicle.

With the information processing method, it is possible to rent out a private vehicle used by an employee when he/she goes to work as the company vehicle to a requestor (for example, another employee) who has sent the rental request. As a result, it is possible to make effective use of the private vehicles, which are not used while the employees are working, and reduce the number of company vehicles held by the company. The company may provide financial assistance to an employee who desires to buy a private vehicle on condition that the employee allows the company to use the private vehicle as the company vehicle.

As used herein, the "company" includes a "corporation" as a legal term. In addition to corporations, other for-profit organizations may also be included. As used herein, the "employee" refers to a person who works for the company. Other persons treated equally to the employees, such as workers dispatched from other companies, may also fall within the meaning of "employee". As used herein, the "private vehicle" refers to a vehicle controlled by an employee, and includes a vehicle owned, occupied, or exclusively used by the employee.

The following configuration may be employed in the information processing method. In other words, the information processing apparatus selects the company vehicle, in response to the rental request, from among the private vehicles used by the employees of the company when they go to work and parked in a parking space for the private vehicles that can be used as the company vehicle. With such a configuration, the employee shows his/her intention to provide the private vehicle as the company vehicle as he/she parks the vehicle in the parking space. As a result, confirming an intention of an individual employee is not required. In addition, a person who rents out a private vehicle can promptly recognize the parking space where the vehicle to be rented out is parked.

In the information processing method, a configuration may be employed in which the information processing apparatus selects the company vehicle, in response to the rental request, from among the private vehicles parked in the parking space, which are specified based on an output from a sensor provided in the parking space.

Further, the following configuration may be employed in the information processing method. In other words, the information processing apparatus selects, in selecting the company vehicle in response to the rental request, a private vehicle that matches at least one of a vehicle type, seating capacity, a color, and a type of a power source, desired by the requestor who has sent the rental request, and included in the rental request. As such, it is possible to rent out a private vehicle that matches at least one of a use, a purpose, and a preference of the person who desires to rent the company vehicle.

Further, the following configuration may be employed in the information processing method. In other words, the information processing apparatus selects, in selecting the company vehicle in response to the rental request, a private vehicle that can be used as the company vehicle and is owned by an employee who leaves work at a time later than a scheduled return time of the company vehicle. The scheduled return time of the company vehicle is included in the rental request. As such, it is possible to rent out a vehicle in a manner that has no influence or less influence on the employee's leaving work.

In the information processing method, a configuration may be employed in which the information processing apparatus transmits availability information to a portable terminal owned by the requestor who has sent the rental request. In this case, the portable terminal may be the same as, or different from the terminal used for sending the rental request. Moreover, the availability information may include information for activating the portable terminal as an electronic key of the private vehicle rented out as the company vehicle. As the portable terminal serves as the electronic key, it is possible to avoid complicated procedures, such as passing a vehicle key between employees and dealing with problems when the vehicle key is lost.

Further, the following configuration may be employed in the information processing method. In other words, the information processing apparatus provides, in a case where the private vehicle is selected in selecting the company vehicle in response to the rental request and rented out as the company vehicle, to the employee who owns the selected private vehicle, information indicating that his/her vehicle is rented out. As a result, it is possible to inform the employee that his/her private vehicle is rented out.

Further, the following configuration may be employed in the information processing method. In other words, the information processing apparatus provides, in a case where information indicating that the private vehicle rented out as the company vehicle will be returned is acquired by a predetermined time before the employee who owns the private vehicle rented out as the company vehicle, leaves work, the information indicating that the private vehicle will be returned to the employee who owns the private vehicle. Otherwise, the information processing apparatus provides information indicating that the return will or may be delayed to the employee who owns the private vehicle. As a result, the employee can know whether the vehicle will be returned on time or may be delayed, and can take action accordingly.

Embodiments

Hereinafter, an information processing method, an information processing apparatus, and an information processing system according to an embodiment will be described with reference to drawings. A configuration of the embodiment is merely an example, and the present disclosure is not limited to the configuration of the embodiment.

System Configuration

FIG. 1 is a schematic diagram of the information processing system according to the embodiment. The information processing system supports an employee of a company to rent out, as the company vehicle, a vehicle used by an employee when he/she goes to work. As illustrated in FIG. 1, the information processing system includes a network 1, a server 2 connected to the network 1, and terminals 3, 4, each of which is capable of communicating with the server 2. The terminal 3 is a terminal device operated by an employee X who provides his/her private vehicle, used when he/she goes to work, as a company vehicle. The terminal 4 is a terminal device operated by an employee Y who desires to use the company vehicle.

Further, the information processing system has a sensor 5 provided in a parking space 11 for a private vehicle (denoted as a vehicle 10) that can be used as the company vehicle. An output of the sensor 5 is input to the server 2.

In the example illustrated in FIG. 1, the parking space 11 is provided on premises 8 of the company. However, a place used as the parking space 11 is not limited thereto, and may be provided in a land outside the premises 8, such as a building or a parking lot. The parking space may be an outdoor space, or a space inside the building, in the basement or on the rooftop of the building.

The premises 8 is provided with a parking space 12 for a private vehicle of an employee who does not desire to rent out his/her vehicle as the company vehicle. An employee who desires or allows his/her private vehicle to be used as the company vehicle parks his/her vehicle in the parking space 11 when he/she goes to work. For example, when the employee X provides his/her private vehicle (a vehicle 10A) as the company vehicle, he/she parks the vehicle 10A in the parking space 11 when he/she goes to work. Meanwhile, the employee who does not desire his/her private vehicle to be used as the company vehicle parks the vehicle in the parking space 12 when he/she goes to work.

In the example illustrated in FIG. 1, the parking space 12 is provided at a location away from the parking space 11. Therefore, the employee Y who desires to rent the company vehicle can promptly recognize that the vehicle 10 parked in the parking space 11 is the private vehicle that can be used as the company vehicle. Further, the parking space 11 may be provided at a location closer to an office building than the parking space 12, such that parking in the parking space 11 is an incentive for providing the private vehicle to be used as the company vehicle.

The parking space 11 and the parking space 12 may be in the same location as long as the employees can distinguish between them, such as using different colors of parking lines that define the parking space 11 and the parking space 12. One or any appropriate number of parking spaces 11 may be provided. By adjusting the number of parking spaces 11, the number of private vehicles used as the company vehicles can be limited. A number, which is an example of identification information (ID), can be assigned to each of a plurality of parking spaces 11.

Each of the parking spaces 11 is provided with a sensor 5 that determines whether the vehicle 10 is present and identifies the vehicle 10. The sensor 5 includes a detection sensor 6 that detects an object placed in the parking space 11 and a camera 7 that captures an image of the object placed in the parking space 11.

The detection sensor 6 has, for example, a light irradiation device (for example, visible light or infrared light) and a light receiving device. The light irradiation device irradiates light on the parking space 11 and the light receiving device receives reflected light of the light emitted from the light irradiation device. When the vehicle 10 is parked in the parking space 11, the light emitted from the light irradiation device and reflected by the vehicle 10 is received by the light receiving device, such that a detection signal indicating that the vehicle 10 is parked is output.

The camera 7 is installed so as to have an angle of view in which an image of a license plate of the vehicle 10 normally parked in the parking space 11 can be captured. The camera 7 captures an image including the license plate when it receives the detection signal. Data of the captured image of the vehicle is sent to the server 2 together with, for example, a sensor ID which is the identification information of the sensor 5.

The server 2 executes a process of determining whether the vehicle 10 is parked in the parking space 11 using the captured image, and a process of identifying the vehicle 10 by analyzing the captured image. Further, in a case where information indicating a correlation between the sensor ID and a parking space 11 number is stored in, for example, a storage device 22 of the server 2, the processor 21 can acquire the parking space 11 number from the sensor ID.

A principle and a method of detecting the vehicle 10, used in the detection sensor 6, are not limited to the above description. The detection sensor 6 may be a sensor which is located at the parking space 11 and detects the reflected light that hits and rebounds from a bottom surface of the vehicle 10. Alternatively, the detection sensor 6 may be a mechanical switch that emits the detection signal for the vehicle 10 when pressed by the vehicle 10. Alternatively, the detection sensor 6 may be a sensor that detects changes in an electric field or a magnetic field due to parking of the vehicle 10 in the parking space 11. Further, in the example illustrated in FIG. 1, a ratio of the parking space 11 to the sensor 5 may be n:1 or 1:n ("n" is a natural number of 1 or more).

The network 1 is, for example, a public communication network, such as the Internet. Examples of public wireless networks include a wide area network (WAN) and other communication networks. The network 1 may include a wireless network. Examples of the wireless network include a cellular network, such as Long-Term Evolution (LTE) or a wireless local area network (LAN) including Wi-Fi.

The server 2 is one example of the "information processing apparatus". The server 2 executes a process of registering the private vehicle (the vehicle 10) that can be used by the employee as the company vehicle in the server 2 by communicating with the terminal 3. The terminal 3 is a terminal device operated by an employee (for example, the employee X) who provides his/her private vehicle as the company vehicle. Further, the server 2 searches for a vehicle 10 to be rented out as the company vehicle by communicating with the terminal 4.

The server 2 searches for a company vehicle in response to the rental request from among the vehicles 10 parked in the parking space 11 and detected by the sensor 5. Moreover, upon determining that one of the vehicles 10 is rented out, the server 2 provides, to the terminal 4, information (availability information) that enables the employee to use the vehicle 10 to be rented out. The employee can use the vehicle 10 using the availability information.

FIG. 1 illustrates the terminal 3 operated by the employee X and the terminal 4 operated by the employee Y, as examples. However the terminal 3 and the terminal 4 may be terminals held by each of the employees who desires to register their private vehicles, or terminals shared by the employees. Alternatively, the terminal 3 and the terminal 4 may be personally owned terminals or terminals rented out by the company.

Server Configuration

Figure 2:
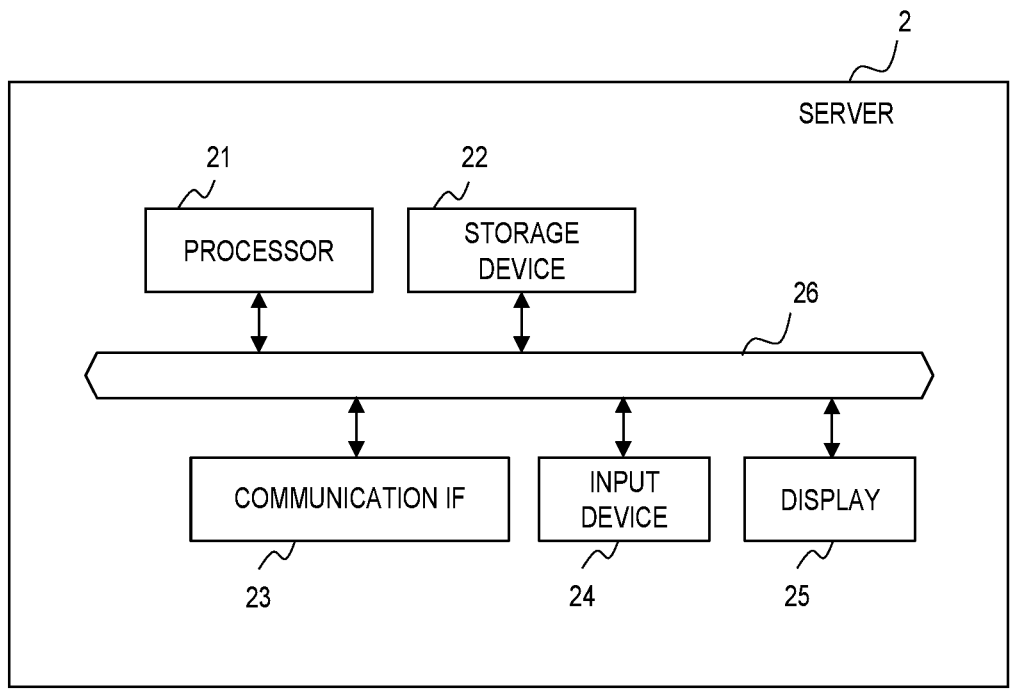
FIG. 2 illustrates a configuration example of a server.

FIG. 2 illustrates a configuration example of the server 2. The server 2 is used in the company to manage a rental system of company vehicles for employees. The server 2 can be composed of a general-purpose information processing apparatus, (a computer) such as a personal computer (PC) or a workstation (WS), or a dedicated information processing apparatus, such as a server machine. The server 2 has a communication function and can be connected to the network 1 by wired or wireless communication.

The server 2 includes a processor 21 as a processing unit or a control unit (a controller), a storage device 22, a communication interface (a communication IF) 23, an input device 24, and a display 25, which are connected to one another via a bus 26. The server 2 may be a single information processing apparatus or a cluster of at least two information processing apparatuses (cloud).

The storage device 22 includes a main storage device and an auxiliary storage device. The main storage device is used as a storage area for programs and data, a development area for programs, a working area for programs, a buffer area for communication data, or the like. The main storage device is composed of a random-access memory (RAM), or a combination of a RAM and a read-only memory (ROM). The auxiliary storage device is used as a storage area for data and programs. The auxiliary storage device includes, for example, a non-volatile storage medium, such as a hard disk, a solid state drive (SSD), a flash memory, or an electrically erasable programmable read-only memory (EEPROM).

The communication IF 23 is a circuit that executes a communication process. The communication IF 23 may be, for example, a network interface card (NIC). Further, the communication IF 23 may be a circuit that executes wireless communication (for example, LTE or wireless LAN (Wi-Fi)), or may be a combination of the NIC and a wireless communication circuit.

The input device 24 includes at least one of a key, a button, a pointing device, a touchscreen, and the like, and is used for inputting information. The display 25 may be, for example, a liquid crystal display, and displays information and data.

The processor 21 may be, for example, a central processing unit (CPU). The processor 21 executes various processes by executing various programs stored in the storage device 22.

For example, the processor 21 executes the process of registering the private vehicle that can be used as the company vehicle. Further, the processor 21 executes a process of searching for the vehicle 10 to be rented out in response to the rental request for the company vehicle and determining the vehicle 10 to be rented out. Moreover, upon determining the vehicle 10 to be rented out, the processor 21 executes a process of providing the availability information of the vehicle 10. Furthermore, the processor 21 executes a process of monitoring whether the rented vehicle 10 is returned.

Terminal Configuration

Figure 3:
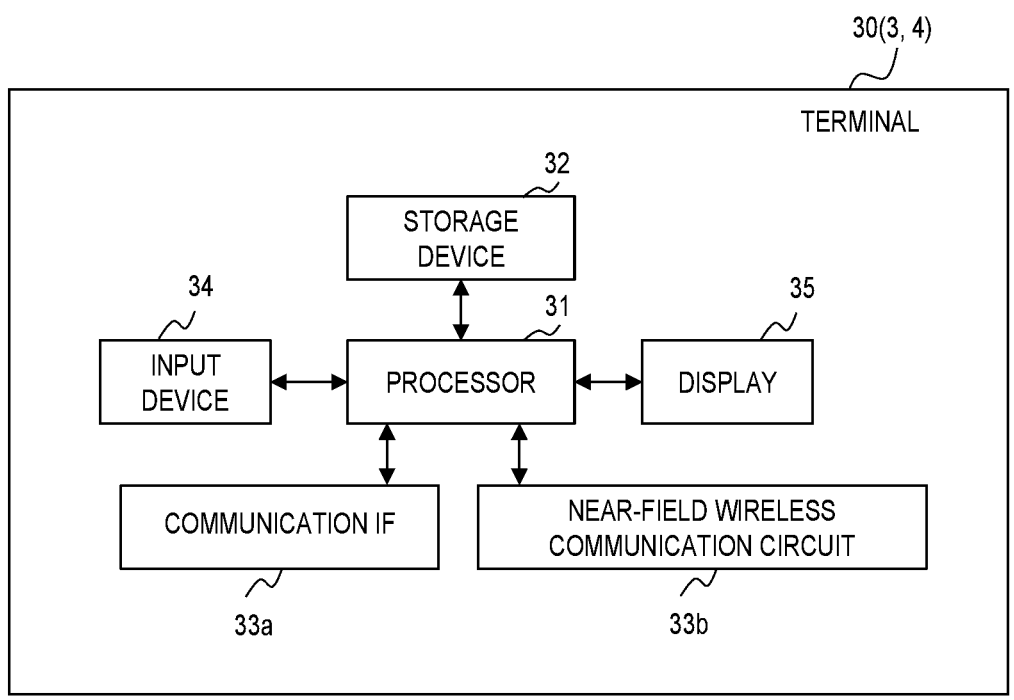
FIG. 3 illustrates a configuration example of a terminal device that can be used as each of terminals illustrated in FIG. 1.

FIG. 3 illustrates a configuration example of a terminal device 30 that can be used as each of the terminal 3 and the terminal 4 illustrated in FIG. 1. Each of the terminal 3 and the terminal 4 may be a mobile terminal or a fixed terminal. Further, each of the terminal 3 and the terminal 4 may be a wireless terminal or a wired terminal. In a case where each of the terminals 3 and the terminal 4 is a wireless terminal, the terminal device 30 may be a portable terminal (a portable communication terminal), such as a laptop personal computer, a smart device (such as a smartphone or a tablet terminal), a personal digital assistant (PDA), a wearable computer, and the like. In a case where each of the terminal 3 and the terminal 4 is a wired terminal, the terminal device 30 may be a PC or a WS. The terminal device 30 may be a general-purpose information processing apparatus or a dedicated information processing apparatus.

The terminal device 30 includes a processor 31, a storage device 32, a communication interface (a communication IF) 33a, a near-field wireless communication circuit 33b, an input device 34, and a display 35. To each of the processor 31, the storage device 32, the communication IF 33a, the input device 34, and the display 35, the same description as that for the processor 21, the storage device 22, the communication IF 23, the input device 24, and the display 25 can be adopted. However, depending on the use and the purpose of use, a device having a different function from that adopted to the server 2 is adopted to the terminal device 30.

The near-field wireless communication circuit 33b executes wireless communication according to a near-field wireless communication protocol. Examples of the near-field wireless communication protocol include a BLE, an NFC, and a UWB. The processor 31 activates the terminal device 30 as each of the terminal 3 and the terminal 4 by executing various programs stored in the storage device 32.

As each of the processor 21 and the processor 31, a plurality of CPUs or a multi-core type CPU may be adopted. At least a part of the process executed by the CPU may be executed by a processor other than the CPU, such as a digital signal processor (DSP) or a graphical processing unit (GPU). Furthermore, at least a part of the process executed by the CPU may be executed by a dedicated or general-purpose integrated circuit, such as an application specific integrated circuit (ASIC) and a field programmable gate array (FPGA), or a combination of the processor and the integrated circuit. The combination is called, for example, a microcontroller (MCU), a SoC (system-on-a-chip), a system LSI, or a chip set. Further, a part of the process executed by the processor 21 may be executed by the processor 31.

Operation Example

Figure 4:
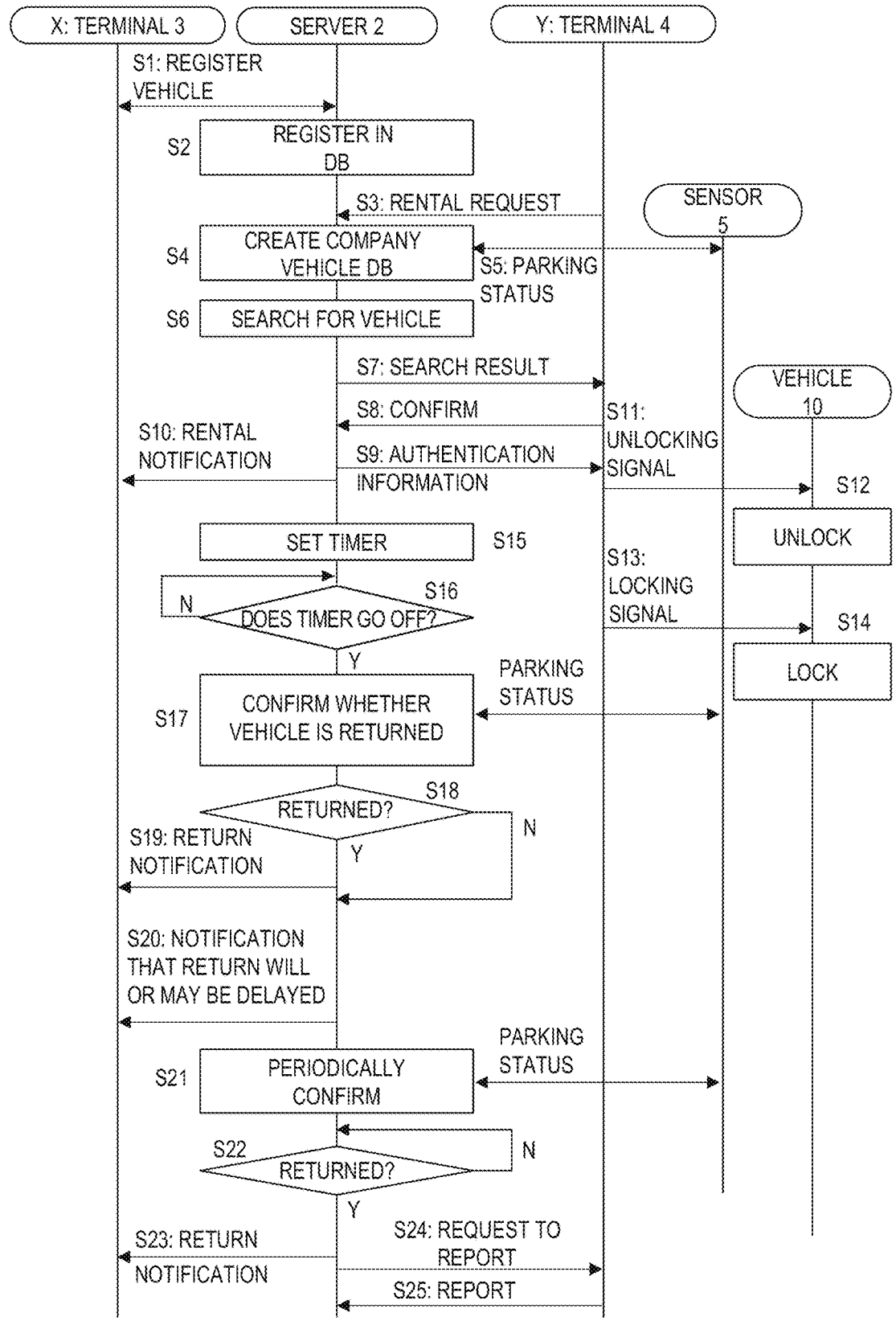
FIG. 4 is a sequence diagram illustrating an operation example of the information processing system.

Hereinbelow, one example of the operation of the information processing system will be described. FIG. 4 is a sequence diagram illustrating an operation example of the information processing system. In FIG. 4, the employee X who desires to provide the private vehicle as the company vehicle executes a process of registering the vehicle 10A in the server 2 using the terminal 3 (step S1).

For example, the server 2 provides a website for managing the company vehicles when the processor 21 executes a program. The terminal 3 receives a user interface (UI) used for accessing the website via the network 1 using a dedicated application installed on the terminal 3 or a web browser, and for registering the private vehicle that can be used as the company vehicle. The employee refers to a UI screen (a vehicle information input screen) displayed on the display 35 of the terminal 3 and inputs vehicle information using the input device 34. The terminal 3 sends a message including the vehicle information to the server 2.

Figure 5:
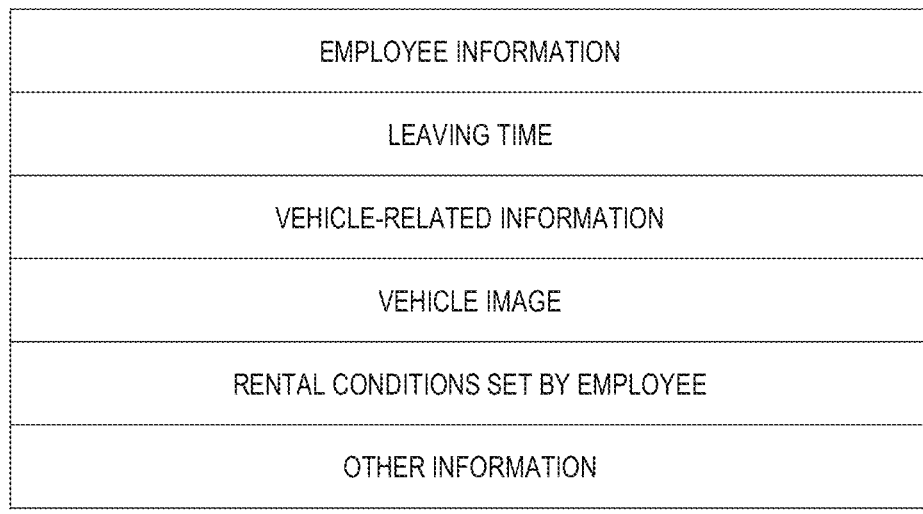
FIG. 5 illustrates an exemplified format of vehicle information.

FIG. 5 illustrates an exemplified format of the vehicle information. As illustrated in FIG. 5, the vehicle information includes employee information, a time when the employee leaves work (hereinafter a "leaving time"), vehicle-related information, a vehicle image (a photograph), rental conditions, and other information. The leaving time may be changeable depending on each day of the week.

The employee information is information indicating attributes of the employee, and includes employee's identification information (an employee ID), name, department to which he/she belongs, a position, contact information, and the like. The vehicle-related information includes information of a license plate number of the vehicle 10 and information indicating attributes of the vehicle 10. The information indicating the attributes of the vehicle 10 includes a vehicle type (a sedan, a wagon, a van, a minivan, or the like), a color, seating capacity, a type of a power source (a gasoline engine, a diesel engine, a hybrid, an EV, or the like), and the like. The vehicle image is a photograph showing the appearance of the vehicle, or the appearance and the inside of the vehicle 10, and illustrates states of scratches or equipment of the vehicle 10.

The rental conditions include information indicating the use or the purpose for which the rental is permitted. Moreover, the rental conditions may include restrictions and precautions when using the vehicle. For example, the restrictions include banning on smoking, eating, and drinking, using a trunk space and rear seats, taking out equipment, and traveling on roads other than paved roads. The precautions include removing mud from shoes, taking trash with him/ her, or the like. The other information includes, for example, approval of precautions and disclaimers upon registration.

In the server 2, the processor 21 receives the vehicle information received by the communication IF 23. The processor 21 stores (registers) the vehicle information in a vehicle database (vehicle DB) (step S2). The vehicle DB can be stored in the storage device 22, or a storage device other than storage device 22, which is accessible by the processor 21.

FIG. 6 illustrates an example of a data structure of the vehicle DB. The vehicle DB consists of one or more entries. The identification information (a vehicle ID) of the vehicle 10, the vehicle-related information including the license plate number, the vehicle image, the employee information, the leaving time and the rental conditions, each of which is associated with an item number, are registered in the entry. Upon receiving the vehicle information, the processor 21 generates a vehicle ID in association with the vehicle information, and registers the vehicle ID and the vehicle information in a vacant entry of the vehicle DB.

It is assumed that the employee Y who desires to use the company vehicle sends the rental request for the company vehicle to the server 2 using the terminal 4 (step S3). In this operation example, it is assumed that the terminal 4 is a smartphone (an example of a portable terminal).

Similar to the terminal 3, the terminal 4 can access the website for managing the company vehicle using a web browser or a dedicated application, and can receive a UI (an input screen) used for inputting information on the rental request. The employee Y inputs information on the rental request using the input screen of the terminal 4. The terminal 4 can send a message including the rental request to the server 2.

FIG. 7 illustrates an exemplified format of the rental request. The rental request includes the employee information, desired vehicle information, a scheduled return time, and other information. The employee information has the same contents as the employee information included in the vehicle information.

The following configuration may be employed. The storage device 22 of the server 2 stores an employee database (DB) in which employee information is registered. The employee ID is included in each of the vehicle information and the rental request, instead of the employee information. The processor 21 acquires, from the employee DB, the employee information corresponding to the employee ID included in each of the vehicle information and the rental request.

The desired vehicle information includes at least one selected from a vehicle type, a color, a type of a power source, seating capacity, and the use or the purpose of the company vehicle that the employee desires to rent out. The use or the purpose includes "a simple movement" (for example, visiting a destination of a business trip), "transporting packages," and "picking up and dropping off people". For example, a sedan is desired for "picking up and dropping off people" while a van or a wagon is desired for "transporting packages".

In the server 2, the processor 21 receives the message of the rental request received by the communication IF 23. The processor 21 executes a process of creating a company vehicle database (a company vehicle DB) in response to the acquisition of the rental request (step S4). In the process of creating the company vehicle DB, the server 2 acquires information indicating a parking status of the vehicle 10 in the parking space 11 (step S5).

Figure 8:
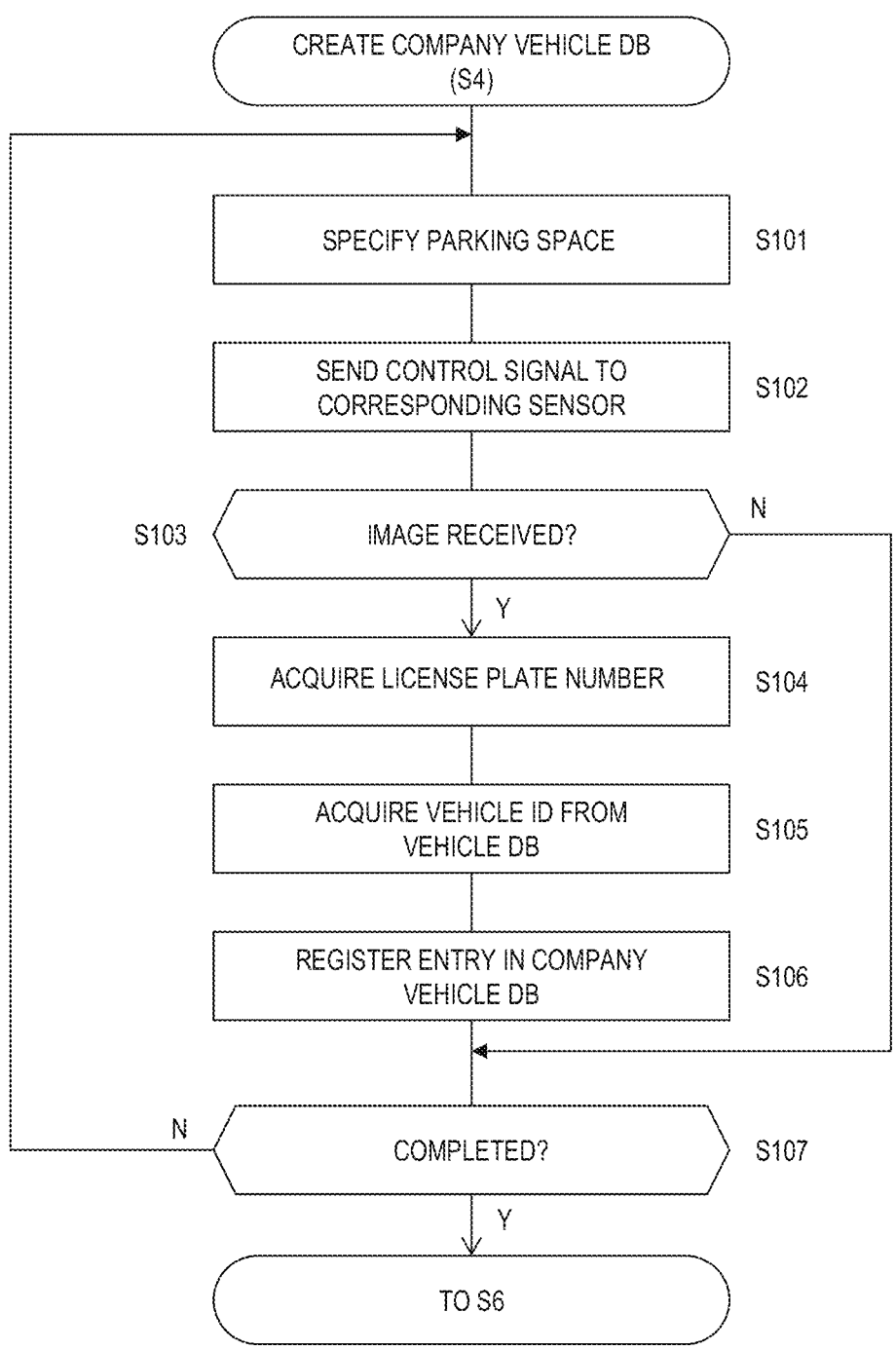
FIG. 8 is a flowchart illustrating an example of a process of creating a company vehicle database.

FIG. 8 is a flowchart illustrating an example of a process of creating a company vehicle DB. The processor 21 executes the following process for the plurality of parking spaces 11. In step S101, the processor 21 specifies one of the parking spaces 11.

In step S102, the processor 21 sends a control signal to the sensor 5 that monitors the parking space 11 specified in step S101. In the sensor 5 that receives the control signal, the irradiation device of the detection sensor 6 irradiates light on the parking space 11. In a case where the vehicle is parked, the light receiving device receives the reflected light, and in a case where the vehicle is not parked, the light receiving device does not receive the reflected light. In the case where the light receiving device receives the reflected light, the camera 7 captures an image of the parked vehicle. Data of the captured image is sent to the server 2. The ID of the sensor 5 may be sent together with the data of the captured image. Further, the parking space number may also be sent.

A configuration may be employed in which the sensor 5 periodically operates even without the control signal sent from the server 2, and in a case where the vehicle 10 is detected, the captured image and the sensor ID are automatically sent to the server 2. In this case, the data of the captured image is stored in a predetermined storage area, such as the storage device 22, and the processor 21 analyzes the data of the captured image stored in the storage area in step S102 to specify the vehicle 10 parked in the parking space 11. Further, in this operation example, since the sensor 5 operates when the control signal is sent thereto, power consumption can be reduced as compared with when the sensor 5 periodically operates.

The processor 21 waits for a response to the control signal, that is, the captured image. In a case where the captured image can be received within a predetermined time (YES in step S103), the process proceeds to step S104. Otherwise, the process proceeds to step S107.

In step S104, the processor 21 analyzes the captured image received from the sensor 5 and acquires the license plate number from an image of the license plate included in the captured image.

In step S105, the processor 21 refers to the vehicle DB, specifies an entry in the vehicle DB having the vehicle-related information including a license plate number matching the license plate number acquired from the captured image, and acquires the vehicle ID in the identified entry.

In step S106, the processor 21 registers an entry of the acquired vehicle ID in the company vehicle database (company vehicle DB). In step S107, the processor 21 determines whether the processes of steps S102 to S106 have been completed for all of the parking spaces 11 to be targeted. When it is determined that the processes have been completed, the process of creating the company vehicle DB is completed and the process proceeds to step S6. On the other hand, when it is determined that the processes have not been completed, the process returns to step S101.

FIG. 9 illustrates an example of a data structure of the company vehicle DB. The company vehicle DB is stored in the storage device 22, or a storage device other than the storage device 22, which is accessible by the processor 21. The company vehicle DB consists of one or more entries, respectively corresponding to the vehicles 10 parked in the parking space 11. In the entry, a status (for example, "rented out" or "unused"), the number of the parking space 11 where the vehicle 10 is parked (the ID of the parking space 11), a borrower (a lessee), a scheduled return time, a time when the vehicle is actually returned, whether the return is delayed, and a reason why the return is delayed, which are associated with the vehicle ID, are registered. However, the time when the vehicle is actually returned, whether the return is delayed, and the reason why the return is delayed are optionally registered.

Figure 10:
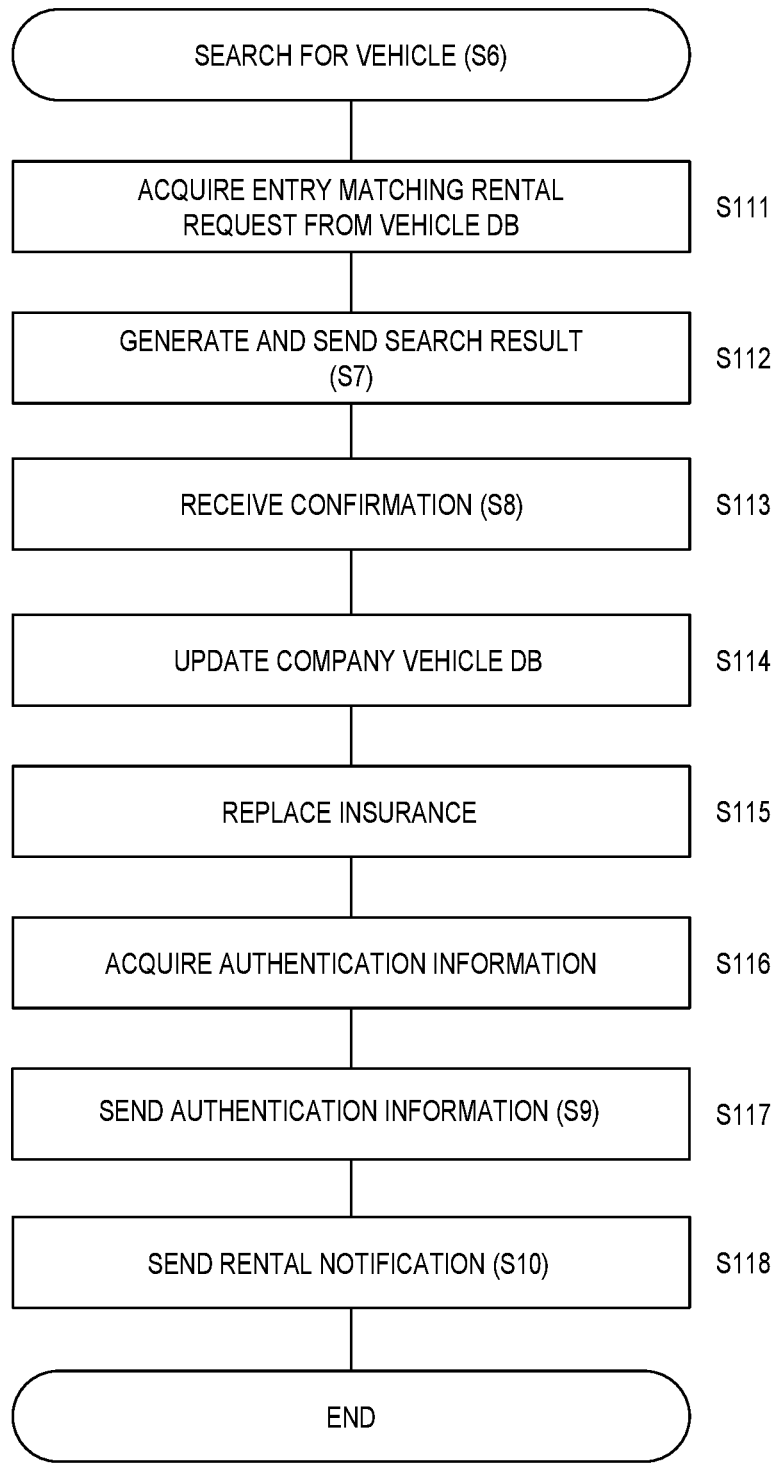
FIG. 10 is a flowchart illustrating one example of a vehicle search process.

Following the creation of the company vehicle DB (S4), the server 2 executes the process of searching for the vehicle 10 to be rented out to the employee who has sent the rental request (step S6). FIG. 10 is a flowchart illustrating one example of a vehicle search process.

In step S111, the processor 21 refers to the vehicle DB and extracts an entry matching the rental request from the vehicle DB. In other words, the processor 21 extracts, from the vehicle DB, an entry that includes vehicle-related information satisfying the desired vehicle information in the rental request and the leaving time later than the scheduled return time in the rental request. For example, it is possible to extract the vehicle 10, in which at least one of the attributes (a vehicle type, a color, seating capacity, a type of a power source, or the like) of the vehicle 10 satisfies the conditions desired by the employee who has sent the rental request, as the vehicle 10 matching the desired rental request. When a plurality of matching entries is found, the processor 21 extracts those entries.

In step S112, the processor 21 executes a process of generating and sending a message showing the search result including the vehicle-related information and the leaving time that are included in the extracted entry. The message showing the search result is sent to the terminal 4 via the communication IF23 (step S7 in FIG. 4).

In the terminal 4, the processor 31 receives the message showing the search result (one or more rental vehicle candidates) via the communication IF 33*a*. The processor 31 displays the search result (vehicle-related information and a leaving time of each vehicle) on the display 35. The employee Y selects the vehicle 10 to be rented out (to be borrowed) (for example, the vehicle 10A of the employee X) from among the candidates for the vehicle 10, displayed on the display 35, and inputs a confirmation that he/she will rent the selected vehicle 10A.

Then, the processor 31 executes a process of generating a message (including the vehicle selection and the confirmation input) showing that the employee Y will rent the vehicle, and of sending the message to the server 2. The message is sent to the server 2 from the communication IF 33*a* (step S8 in FIG. 4).

In step S113, the processor 21 receives the message showing that the employee Y will rent the vehicle. In step S114, the processor 21 updates the company vehicle DB. In other words, the employee ID of the borrower (the employee Y) and the scheduled return time are registered in the entry in which the vehicle ID of the vehicle 10A that is confirmed to be rented out is registered. At this time, the entry of the vehicle listed as candidates but not selected may be deleted.

In step S115, the processor 21 executes a process of replacing a vehicle insurance for the vehicle 10A with an insurance that the company buys for the company vehicle. For example, the company enters into an insurance contract with an insurer for a vehicle provided as the company vehicle. The contract includes a special provision that the insured vehicle can be replaced by the private vehicle provided as the company vehicle at an appropriate timing.

In this case, the processor 21 executes a process of setting the vehicle 10A that is confirmed to be rented out as the vehicle covered by the vehicle insurance which is applied to the company vehicle, during a period from the rental to return, according to an agreement between the company and the insurer (a first method).

Alternatively, the processor 21 may obtain an approval from the insurer for an insurance coverage each time the vehicle 10A is rented out. For example, when the processor 21 determines to rent a vehicle, it may send a request for the insurance coverage for the vehicle 10A to be rented out to a computer of the insurer via the network 1 to cover the vehicle 10A to be rented out, and receive the approval for the insurance coverage from the computer of the insurer (a second method).

In both the first and second methods, at the appropriate timing, the vehicle 10A is excluded from the insurance coverage as the company vehicle. For example, when the vehicle 10A is returned, the processor 21 executes a process of restoring the insurance applied to the vehicle 10A. Alternatively, an expiry of the insurance coverage is set according to the scheduled return time such that the vehicle 10A is automatically excluded from the insurance coverage at the expiry.

In step S116, the processor 21 acquires authentication information, which is one example of the information that enables the employee Y to use the vehicle 10, from the storage device 22. The authentication information is information for authenticating the portable terminal (the terminal 4) held by the employee Y. The authentication information may be read from the storage device 22, generated according to a predetermined algorithm, or acquired from the network 1. As the authentication information, for example, biometric information of the employee X (information obtained by quantifying any of fingerprints, an iris, and palm veins) may be used.

In step S117, the processor 21 executes a process of sending the authentication information to the terminal 4, and ends the vehicle search process. The message including the authentication information is sent to the terminal 4 (step S9 in FIG. 4). In step S118, the processor 21 generates contact information (rental notification) notifying that the vehicle 10A is rented out and sends the information to the terminal 3 (step S10 in FIG. 4).

The terminal 4 that has received the message including the authentication information stores the authentication information in the storage device 32. As a result, the terminal 4 can operate as an electronic key of the vehicle 10A while storing the authentication information.

Figure 11:
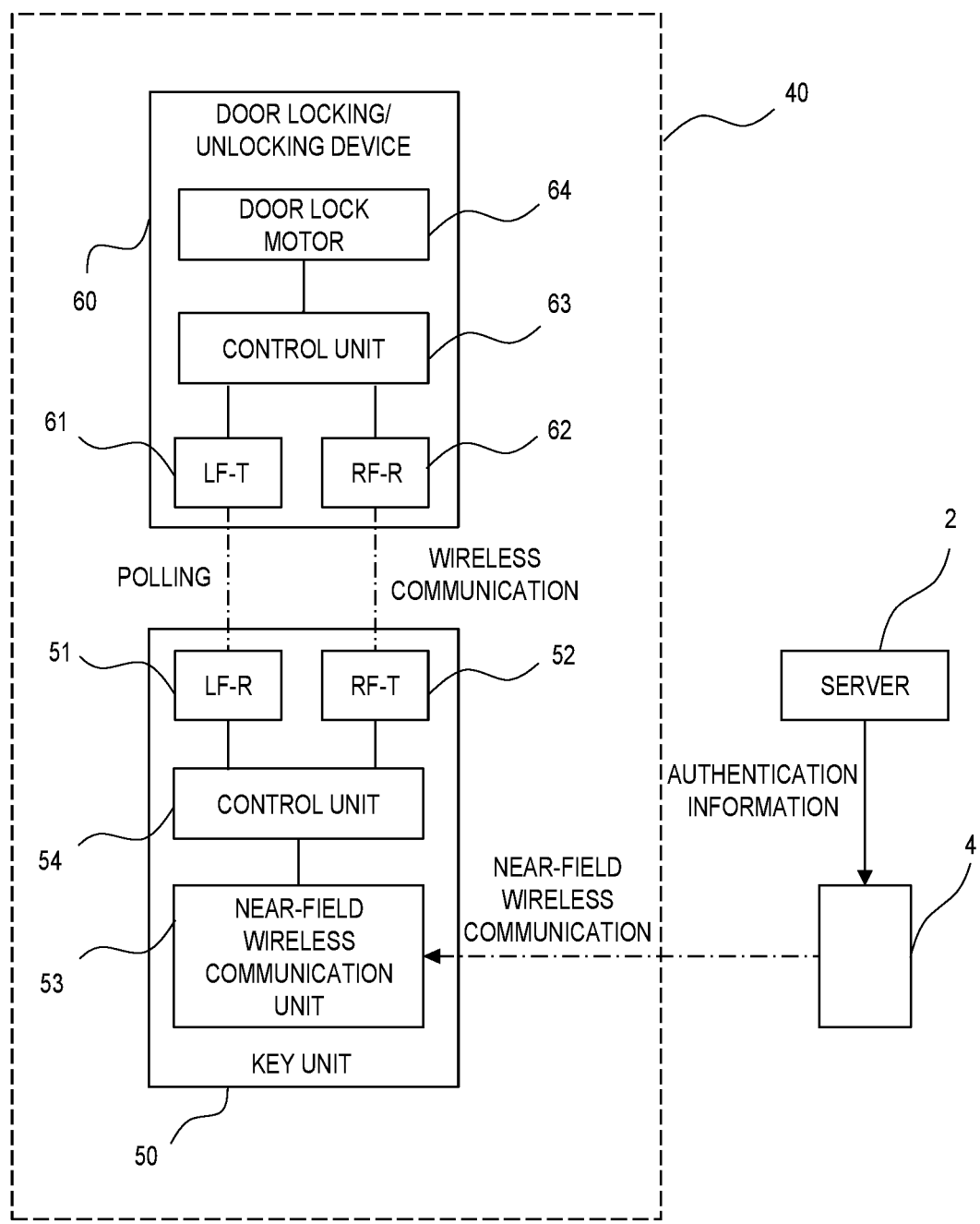
FIG. 11 is a diagram illustrating a configuration example of a door locking/unlocking system.

FIG. 11 is a diagram illustrating a configuration example of a door locking/unlocking system of the vehicle 10 including the terminal 4. The door locking/unlocking system activates the terminal 4 as the electronic key of the vehicle 10. As illustrated in FIG. 11, the door locking/unlocking system includes the server 2, the terminal 4, and an in-vehicle device 40 mounted on the vehicle 10 (for example, the vehicle 10A). The in-vehicle device 40 includes a key unit 50 and a door locking/unlocking device 60. The key unit 50 includes a low frequency receiver (LF-R) 51, a high frequency transmitter (RF-T) 52, a near-field wireless communication unit 53, and a control unit (a controller) 54.

The LF-R 51 receives a polling signal sent from the door locking/unlocking device 60 via radio waves in the low frequency (LF) band. The RF-T 52 sends a door locking/unlocking signal to the key unit 50 via radio waves in the radio frequency (RF) band. The door locking/unlocking signal is a signal for unlocking a door of the vehicle 10 (an unlocking signal) or a signal for locking the door thereof (a locking signal).

In the terminal 4, a door locking/unlocking screen used for locking/unlocking the vehicle 10 can be summoned on the display 35 by operating the input device 34. The door locking/unlocking screen has an unlocking button used for unlocking the door of the vehicle 10, and a locking button used for locking the door thereof. When the unlocking button is pressed, the unlocking signal is generated on the terminal 4. On the other hand, when the locking button is pressed, the locking signal is generated on the terminal 4. Each of the unlocking signal and the locking signal is sent from the near-field wireless communication circuit 33*b* as radio waves according to a near-field wireless communication protocol (for example, a BLE) together with the authentication information obtained from the server 2.

The key unit 50 is placed at a predetermined position in the vehicle 10. The near-field wireless communication unit 53 receives the authentication information and the door locking/unlocking signal by the near-field wireless communication. The control unit 54 recognizes the presence of the door locking/unlocking device 60 based on the polling signal received by the LF-R 51. Further, the control unit 54 compares the authentication information received by the near-field wireless communication unit 53 from the terminal 4 with the authentication information stored in a storage device included in the control unit 54. As a result of the comparison, in a case where the former matches the latter, the control unit 54 determines that the authentication is successful, and in a case where the former does not match the latter, the control unit 54 determines that the authentication has failed. In the case where the authentication is successful, the control unit 54 executes control of generating the door locking/unlocking signal and of sending the door locking/unlocking signal and the electronic key ID (key ID) from the RF-T 52 to the door locking/unlocking device 60. The method of authenticating the terminal 4 is not limited to the above example.

The door locking/unlocking device 60 includes a low frequency transmitter (LF-T) 61, a high frequency receiver (RF-R) 62, a control unit (controller) 63, and a door lock motor 64. The LF-T 61 periodically sends the polling signal. The RF-R 62 hands the door locking/unlocking signal and the key ID sent from the key unit 50 over to the control unit 63. The control unit 63 may be, for example, an ECU. The control unit 63 determines whether the key ID is valid based on whether the key ID from the RF-R 62 matches the key ID held by the control unit 63. In a case where the key ID is not valid, the control unit 63 does not execute any processes. On the other hand, in a case where the key ID is valid, the control unit 63 controls the operation of the door lock motor 64 using the door locking/unlocking signal such that the door is locked/unlocked. In other words, when the door locking/unlocking signal is the unlocking signal, the door of the vehicle 10 is unlocked. On the other hand, when the door locking/unlocking signal is the locking signal, the door is locked.

The process of determining the validity of the key ID and the process of controlling the door lock motor 64 may be respectively executed by two different control units (for example, a checkup ECU and a body ECU). The validity determination of the key ID is not limited to the above example. Further, the encrypted key ID may be received and the validity may be determined after a decryption process of the key ID.

In a case where the vehicle 10A of the employee X is provided as the company vehicle, the key unit 50 is placed inside the vehicle 10A. For example, the employee X rents the key unit 50 from the company and places it inside the vehicle. Therefore, even in a case where the employee X does not own the key unit 50, he/she places the key unit 50 provided from the company in the vehicle 10A, so that the door of the vehicle 10A can be locked/unlocked using the terminal 4 of the employee Y (the borrower). At this time, a direct exchange between the employee X and the employee Y does not occur. On the other hand, in a case where the vehicle 10A is provided with a device in which the key unit 50 and the door locking/unlocking device 60 are integrated, the key unit 50 does not have to be installed.

The employee Y who rents the vehicle 10 goes to the parking space 11 of the vehicle 10A with the terminal 4, summons the door locking/unlocking screen on the display 35, and presses the unlocking button. Then, the key unit 50 of the vehicle 10A receives the unlocking signal and the authentication information (step S11), and the door is unlocked (step S12).

As a result, the employee Y can board the vehicle 10A, sit in a driver's seat, and press a start button provided in the vehicle. When the start button is pressed, the engine of the vehicle 10A is activated so that the employee Y can drive the vehicle 10A. The employee Y pulls out the vehicle 10A from the parking space 11 and moves to the destination (a place where he/she works away from the office).

After finishing his/her work outside the office, the employee Y returns to the office and parks the vehicle 10A in the parking space 11. The parking space 11 in which the vehicle 10A is parked after it is returned may be the same or different from the parking space 11 in which the vehicle 10A is parked when it is rented out. The employee Y exits the vehicle 10A, summons the door locking/unlocking screen on the display 35 of the terminal 4, and presses the locking button. Then, the locking signal and the authentication information are sent to the key unit 50 of the vehicle 10A (step S13), and the door of the vehicle 10A is locked. As a matter of course, the employee Y can unlock and lock the door of the vehicle 10A as many times as he/she desires by using the terminal 4 during a period from the rental to return. Further, in a case where the vehicle 10A has a trunk, the trunk may be unlocked or locked as the door is unlocked or locked.

The authentication information is automatically deleted after a predetermined time has elapsed since it was received by the terminal 4. Alternatively, the key unit 50 may change the authentication information to invalidate the authentication information from the terminal 4. Alternatively, the server 2 may send an instruction to delete or invalidate the authentication information to the terminal 4 at a predetermined timing.

The processor 21 of the server 2 sets a timer (step S15) after sending the authentication information, and before and after sending the rental notification (step 10). The timer is set to a predetermined time before the leaving time, for example, a time tracing back by a predetermined time (for example, 10 minutes) from the leaving time of the employee X who rents out the vehicle 10A. The processor 21 can acquire the leaving time of the employee X from the vehicle DB using the vehicle ID of the vehicle 10A. Setting the predetermined time to 10 minutes is a mere example, and the predetermined time may be longer or shorter than 30 minutes.

When the timer goes off (YES in step S16), the processor 21 executes a process of confirming whether the vehicle is returned (step S17). In other words, the processor 21 sends the control signals to the sensors 5 respectively corresponding to the parking spaces 11, and waits for the captured image of the vehicle 10A to be sent from any of the sensors 5. At this time, in a case where the captured image of the vehicle 10A is received, the server 2 determines that the vehicle 10A has been returned (YES in step S18), and sends a message of return notification to the terminal 3 (step S19).

Upon receiving the message, the terminal 3 displays the return notification on the display 35. As a result, the employee X is notified that the vehicle 10A has been returned. The return notification may be a push notification or an e-mail as long as the employee X can recognize that the vehicle 10A has been returned.

Further, the sensor 5 may send the ID of the sensor 5 together with the captured image, and the server 2 may be able to determine the parking space 11 number from the ID of the sensor 5. Moreover, the sensor 5 may send the parking space 11 number to the server 2 together with the captured image. Alternatively, the server 2 may acquire the parking space 11 number in the captured image by analyzing the captured image. In those cases, a configuration may be employed in which the sensor 5 transmits, to the server 2, the return notification and informs the server 2 of the number of the parking space 11 where the vehicle 10A is parked, such that the employee X easily finds the vehicle 10A when he/she leaves work.

In a case where it is determined that the vehicle 10A has been returned, the processor 21 registers the time when the vehicle is actually returned in the entry of the vehicle 10A in the company vehicle DB, and stores the entry in which the time is registered in a rental history of the company vehicle provided in the storage device 22 or the like. At this time, the registration details of the company vehicle DB may be deleted. The rental history of the company vehicle is used, for example, to calculate compensation to be given to the employee X who provides the private vehicle.

In a case where no response is sent from any of the sensors 5 in step S18, the processor 21 generates a message (notification of a delay possibility) including a notification that the return of the vehicle 10A will or may be delayed, and sends the message to the terminal 3 of the employee X (step S20). The terminal 3 that has received the notification of a delay possibility displays the notification on the display 35. As such, in a case where the vehicle is likely to be returned after the leaving time, the employee is notified. As a result, the employee who will leave work soon can make a better choice of, for example, waiting for the return at his/her own desk instead of going to the parking space 11.

Steps S21 to S25 illustrated in FIG. 4 are operations executed when the vehicle 10A is not returned in step S18. In step S21, the processor 21 of the server 2 periodically (for example, every 5 to 10 minutes) monitors the parking status of the parking space 11, and determines whether the vehicle 10A is returned based on the response from the sensor 5 (step S22).

Upon determining that the vehicle 10A has been returned in step S22 (YES in S22), the processor 21 generates a message including the return notification and sends the message to the terminal 3 (step S23). At this time, an apology for the delay may be included in the message. Alternatively, instead of or together with the apology, the employee X may be given compensation (such as a discount voucher for a cafeteria in the company).

Upon determining that the vehicle 10A has been returned in step S22, the processor 21 registers the time when the vehicle is actually returned in the entry of the vehicle 10A in the company vehicle DB, and records that the return is "delayed". Further, the processor 21 generates a message including a request to report the reason why the return was delayed to the employee Y and sends the message to the terminal 4 (step S24).

The employee Y inputs the reason why the return was delayed to the terminal 4 in response to the report request received by the terminal 4. The terminal 4 sends a message including the reason to the server 2. When the server 2 receives the message, the server 2 records the reason in the message in the corresponding entry of the company vehicle DB. The entry is then stored in the rental history of the company vehicle. The reason why the return was delayed is used as a resource for improving the service of renting the private vehicle as the company vehicle.

The energy consumed during the rental of the private vehicle (the vehicle 10) is supplied (for example, refueling or charging) by the owner of the private vehicle (for example, the employee X). However, when a time required for energy supply (for example, refueling) is short, the borrower (for example, the employee Y) may supply the energy before returning the vehicle. The payment for the energy may be borne by the company or offset by the compensation to be given from the company to the employee who provides the private vehicle. Further, in a case where the vehicle 10, for example, got scratches during the period from the rental to return, the company may compensate the repair costs.

Operation and Effect of Embodiment

With the information processing system according to the embodiment, by the support of the server 2, the company can rent out the vehicle 10 used by the employee X when he/she goes to work and parked in the parking space 11 to the employee Y as the company vehicle. As a result, the company can avoid holding useless company vehicles. The employees can be given compensation from the company by allowing their private vehicles to be used as the company vehicles.

Modified Example

In the above-described embodiment, a configuration is employed in which the processor 21 of the server 2 sends the control signal to the sensor 5 when receiving the rental request, and receives the response to update the company vehicle DB. On the other hand, regardless of the rental request, a configuration may be employed in which the sensor 5 periodically operates, and the company vehicle DB is constructed based on the result of the operation and referred to when the vehicle is searched for in response to the rental request. Alternatively, the company vehicle DB may be updated by an interrupt process in a case where the data from the sensor 5 arrives at the server 2.

Figure 12:
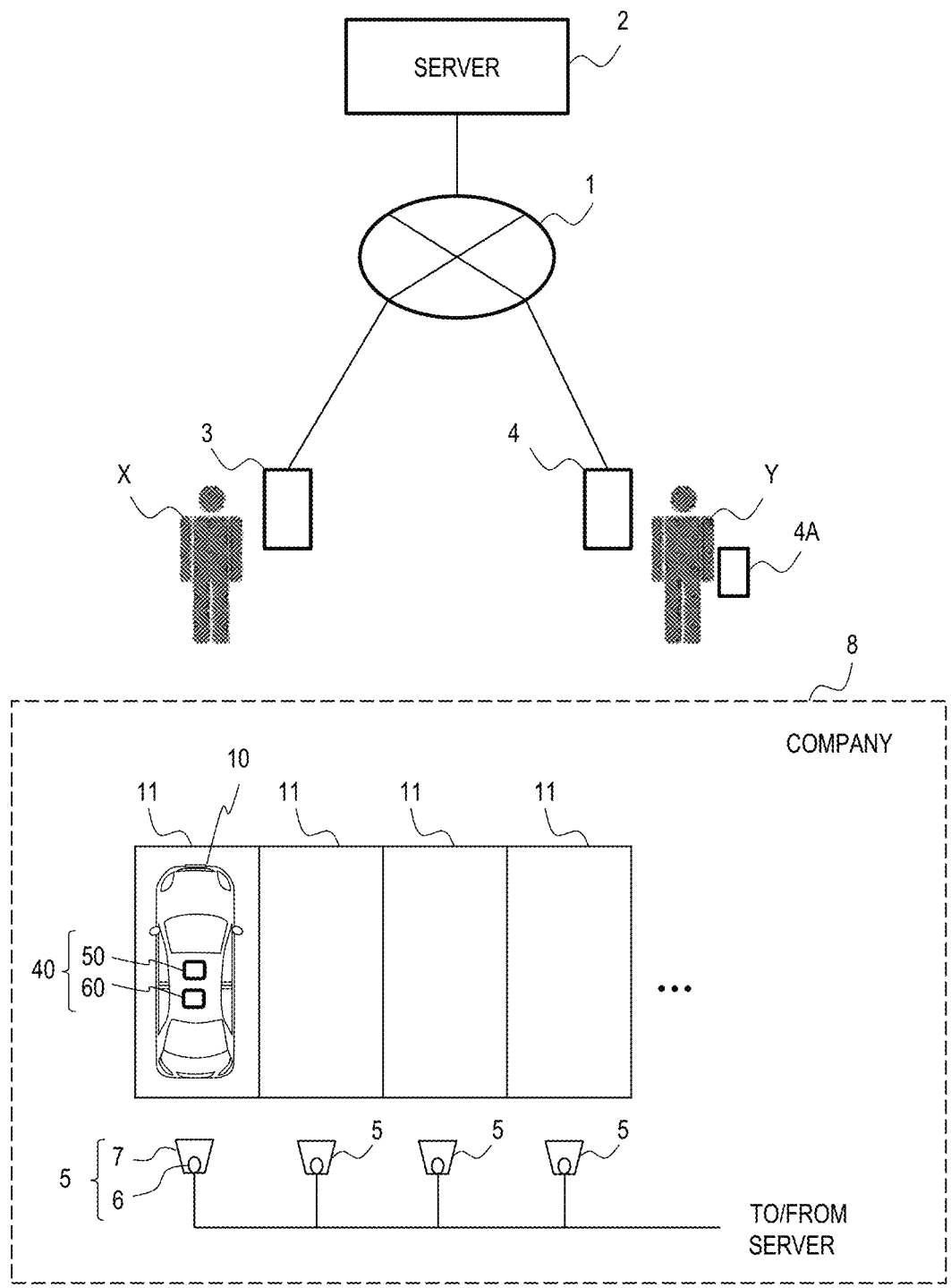
FIG. 12 is a diagram illustrating a modified example of the embodiment.
Figure 13:
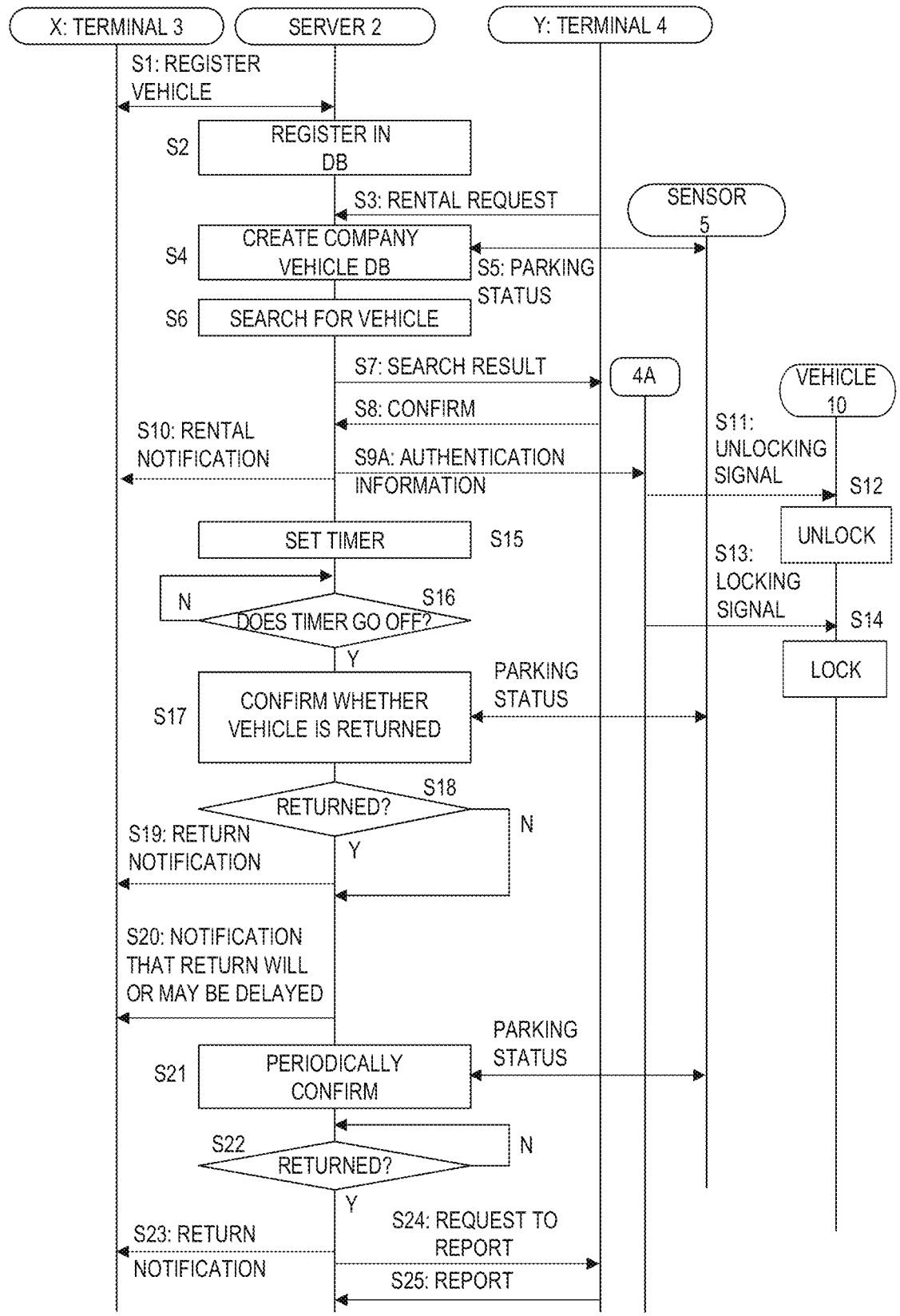
FIG. 13 is a sequence diagram illustrating the modified example of the embodiment.

Further, instead of the configuration described in the embodiment, a configuration of the modified example illustrated in FIGS. 12 and 13 may be employed. In other words, as illustrated in FIG. 12, the employee Y who desires to rent the company vehicle may separately use the terminal 4 by which he/she sends the rental request and a portable terminal 4A (a terminal different from the terminal 4) by which he/she receives the authentication information. The portable terminal 4A can communicate with the server 2 via the network 1.

For example, the terminal 3 and the terminal 4 are fixed terminals used for operating a groupware used for establishing communication between employees in the company. On the other hand, the portable terminal 4A is a smartphone held by the employee Y. The rental request includes a network address of the portable terminal 4A (for example, included in the "other information"). In a case where it is determined that the vehicle 10 is rented out to the employee Y, the server 2 transmits the authentication information to the portable terminal 4A using the network address (see S9A in FIG. 13). The employee Y can activate the portable terminal 4A as the electronic key of the vehicle 10 instead of the terminal 4 in the embodiment.

In the embodiment, the terminal 3 registers the vehicle information, and also receives the rental notification, the return notification, and the notification that the return of the vehicle will or may be delayed. On the other hand, instead of the terminal 3, the employee X may separately use a terminal by which he/she registers the vehicle information, and a terminal by which he/she receives the rental notification, the return notification, and the notification that the return of the vehicle will or may be delayed. For example, the terminal by which he/she registers the vehicle information may be a business terminal rented out by the company to the employee X, and the terminal by which he/she receives the notifications may be a portable terminal personally owned by the employee X.

Others

The embodiments stated above are mere examples, and the present disclosure can be appropriately modified and implemented within a range not departing from the scope thereof. Further, the process described as being executed by a single device may be executed in a shared manner by a plurality of devices. Alternatively, the process described as being executed by different devices may be executed by a single device. In the computer system, the hardware configuration (the server configuration) that implements each function can be flexibly changed.

The present disclosure can also be implemented by supplying a computer program for having the functions described in the embodiments in a computer, and reading and executing the program by one or more processors included in the computer. Such a computer program may be provided to the computer by a non-transitory computer-readable storage medium connectable to a computer system bus, or may be provided to the computer via the network. A non-transitory computer-readable storage medium is any disk selected from, for example, a magnetic disk (a Floppy® disk, a hard disk drive (HDD) and the like), and an optical disk (a CD-ROM, a DVD disk, a Blu-ray disk, and the like), and the like. Further, the non-transitory computer-readable storage medium includes any type of medium suitable to store electronic instructions, which is selected from a ROM, a RAM, an EPROM, an EEPROM, a magnetic card, a flash memory, an optical card, and the like.

What is claimed is:

1. A method for car-sharing of private vehicles, the method executed by at least one processor, the method comprising:
   acquiring, from a requestor, a rental request for a company vehicle used for a business operation of a company;
   selecting, in response to the rental request, a private vehicle from a set of private vehicles that are used by employees of the company when going to work and are registered for use as the company vehicle;
   acquiring, from the requestor, a rental confirmation of the selected private vehicle;
   transmitting, in response to the rental confirmation, to a portable terminal of the requestor, availability information that enables use of the selected private vehicle, the availability information including authentication information for the selected private vehicle, the portable terminal thereby activated as an electronic key of the selected private vehicle;
   receiving an unlocking signal and the authentication information, transmitted from the portable terminal, at a wireless communication unit of the selected private vehicle;
   comparing the received authentication information with preset authentication information stored in a key controller of the selected private vehicle,
   receiving a polling signal at a polling receiver coupled to the key controller, the polling signal being transmitted wirelessly in a low frequency band from a polling transmitter coupled to a locking/unlocking controller for a door of the selected private vehicle, the key controller thereby recognizing the locking/unlocking controller;
   selectively transmitting the unlocking signal to the locking/unlocking controller, based on results of the comparison of authentication information, the unlocking signal being transmitted wirelessly in a radio frequency band from a key transmitter coupled to the key controller and received by a key receiver coupled to the locking/unlocking controller; and
   controlling, in response to receipt of the unlocking signal by the locking/unlocking controller, a door lock motor to unlock the door of the selected private vehicle,
   wherein a first private vehicle in the set of private vehicles is indicated as presently unavailable for selection based on the first private vehicle being positioned in a first parking space indicating private use,
   wherein a second private vehicle in the set of private vehicles is indicated as presently available for selection based on the second private vehicle being positioned in a second parking space indicating shared use, and
   wherein the second private vehicle is selected, in response to the rental request, based on the second private vehicle being positioned in the second parking space.

2. The method according to claim 1, wherein the second private vehicle is selected, in response to the rental request, further based on an output from a sensor provided in the second parking space.

3. The method according to claim 1, wherein the private vehicle is selected based on desired vehicle information included in the rental request, the desired vehicle information including at least one of a kind of a vehicle, seating capacity, a color, and a kind of a power source.

4. The method according to claim 1, wherein the private vehicle is selected based on ownership by an employee who leaves work at a time later than a scheduled return time of the company vehicle, the scheduled return time being included in the rental request.

5. The method according to claim 1, wherein the rental request is acquired from a requesting terminal of the requestor, the portable terminal being different from the requesting terminal.

6. The method according to claim 1, further comprising providing, in response to the rental confirmation, to an employee who owns the selected private vehicle, information indicating that the selected private vehicle is rented out.

7. The method according to claim 1, further comprising:
   providing, in response to acquiring, by a predetermined time, return information indicating that the selected private vehicle has been returned, the return information to an employee who owns the selected private vehicle, and
   providing, in response to not acquiring the return information by the predetermined time, information indicating a possible return delay to the employee who owns the selected private vehicle,
   wherein the predetermined time is prior to a time that the employee leaves work.

8. An apparatus for car-sharing of private vehicles, the apparatus comprising at least one processor configured to:

acquire, from a requestor, a rental request for a company vehicle used for a business operation of a company;

select, in response to the rental request, a private vehicle from a set of private vehicles that are used by employees of the company when going to work and are registered for use as the company vehicle;

acquire, from the requestor, a rental confirmation of the selected private vehicle; and transmit, in response to the rental confirmation, to a portable terminal of the requestor, availability information that enables use of the selected private vehicle, the availability information including authentication information for the selected private vehicle, the portable terminal thereby activated as an electronic key of the selected private vehicle, wherein a first private vehicle in the set of private vehicles is indicated as presently unavailable for selection based on the first private vehicle being positioned in a first parking space indicating private use, wherein a second private vehicle in the set of private vehicles is indicated as presently available for selection based on the second private vehicle being positioned in a second parking space indicating shared use, wherein the second private vehicle is selected, in response to the rental request, based on the second private vehicle being positioned in the second parking space, and wherein an in-vehicle device for the selected private vehicle, based on receiving an unlocking signal and the authentication information from the portable terminal at a wireless communication unit of the in-vehicle device, controls a door lock motor to unlock a door of the selected private vehicle.

9. The apparatus according to claim 8, wherein the second private vehicle is selected, in response to the rental request, based on an output from a sensor provided in the second parking space.

10. The apparatus according to claim 8, wherein the private vehicle is selected based on desired vehicle information included in the rental request, the desired vehicle information including at least one of a kind of a vehicle, seating capacity, a color, and a kind of a power source.

11. The apparatus according to claim 8, wherein the private vehicle is selected based on ownership by an employee who leaves work at a time later than a scheduled return time of the company vehicle, the scheduled return time being included in the rental request.

12. A system for car-sharing of private vehicles, the system comprising:
at least one server processor configured to:
acquire, from a requestor, a rental request for a company vehicle used for a business operation of a company,
select, in response to the rental request, a private vehicle from a set of private vehicles that are used by employees of the company when going to work and are registered for use as the company vehicle,
acquire, from the requestor, a rental confirmation of the selected private vehicle,
transmit, in response to the rental confirmation, to the requestor, availability information that enables use of the selected private vehicle, the availability information including authentication information for the selected private vehicle;
a portable terminal of the requestor, the portable terminal configured to receive the availability information via a network to be thereby activated as an electronic key of the selected private vehicle; and
an in-vehicle device for the selected private vehicle, comprising:
a wireless communication unit configured to receive an unlocking signal and the authentication information from the portable terminal,
a key controller coupled to a key transmitter and a polling receiver, the key controller storing preset authentication information and configured to compare the received authentication information with the preset authentication information, and
a locking/unlocking controller coupled to a key receiver and a polling transmitter, the locking/unlocking controller configured to, in response to receipt of the unlocking signal by the key receiver, control a door lock motor to unlock a door of the selected private vehicle, wherein the polling transmitter is configured to transmit a polling signal wirelessly in a low frequency band to the key controller through the polling receiver, the key controller thereby recognizing the locking/unlocking controller, wherein the key transmitter is configured to selectively transmit the unlocking signal to the locking/unlocking controller through the key receiver, based on results of the comparison of authentication information by the key controller, the unlocking signal being transmitted wirelessly in a radio frequency band, wherein a first private vehicle in the set of private vehicles is indicated as presently unavailable for selection based on the first private vehicle being positioned in a first parking space indicating private use, wherein a second private vehicle in the set of private vehicles is indicated as presently available for selection based on the second private vehicle being positioned in a second parking space indicating shared use, and wherein the second private vehicle is selected, in response to the rental request, based on the second private vehicle being positioned in the second parking space.

13. The system according to claim 12, wherein the at least one server processor acquires the rental request from a requesting terminal of the requestor which is different from the portable terminal.

14. The system according to claim 12, further comprising:
an owner terminal of an employee who owns the selected private vehicle, the owner terminal being configured to receive from the at least one server processor via the network, in response to the rental confirmation, information indicating that the selected private vehicle is rented out.

15. The system according to claim 12, further comprising:
an owner terminal of an employee who owns the selected private vehicle,
wherein the at least one server processor is further configured to provide to the owner terminal via the network:
in response to acquiring, by a predetermined time, return information indicating that the selected private vehicle has been returned, the return information, and
in response to not acquiring the return information by the predetermined time, information indicating a possible return delay, wherein the predetermined time is prior to a time that the employee leaves work.

* * * * *